US012697643B2

(12) United States Patent
Gharz

(10) Patent No.: US 12,697,643 B2
(45) Date of Patent: Aug. 4, 2026

(54) ROTATION SYSTEM FOR ROTATING A PACKAGED ITEM

(71) Applicant: Deutsche Post AG, Bonn (DE)

(72) Inventor: Usama Gharz, Wandlitz (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 18/883,618

(22) Filed: Sep. 12, 2024

(65) Prior Publication Data

US 2025/0091093 A1 Mar. 20, 2025

(30) Foreign Application Priority Data

Sep. 15, 2023 (DE) .......................... 102023124931.2

(51) Int. Cl.
*B07C 5/36* (2006.01)
*B07C 5/10* (2006.01)
*B65G 47/244* (2006.01)

(52) U.S. Cl.
CPC ................ *B07C 5/362* (2013.01); *B07C 5/10* (2013.01); *B65G 47/244* (2013.01); *B65G 2203/0225* (2013.01); *B65G 2203/044* (2013.01)

(58) Field of Classification Search
CPC ......... B07C 5/10; B07C 5/362; B65G 47/244; B65G 2203/0225; B65G 2203/044
See application file for complete search history.

(56) References Cited

U.S. PATENT DOCUMENTS 3,216,311 A * 11/1965 Bibbero .................... B07C 5/10
                                                348/125
7,007,792 B1 * 3/2006 Burch .................. B65G 47/244
                                                198/779
(Continued)

FOREIGN PATENT DOCUMENTS

DE       102013013809 A1    2/2015
WO       WO 2004/076319 A1  9/2004
WO       WO-2018106104 A1 *  6/2018   ............. B65G 43/08

OTHER PUBLICATIONS

KR 20160006291 A with English Translation; Inv: Moon et al.; Pub. Date: Jan. 2016 (Year: 2016).*

(Continued)

*Primary Examiner* — Joseph C Rodriguez
(74) *Attorney, Agent, or Firm* — Dority & Manning, P.A.

(57) ABSTRACT

A rotation system for a sorting system for at least partially rotating a packaged item, having a roller conveyor for the deposition of the packaged item and a conveyor belt, adjoining the roller conveyor, for transporting the packaged item along a rotation unit is disclosed. The rotation system includes a measuring system, which includes a light curtain and is configured to determine a length and a width of the packaged item, that is arranged on the conveyor belt ahead of the rotation unit. The measuring system furthermore includes an evaluation unit, which is configured to determine a diagonal of the packaged item, depending on the measured length and width of the packaged item. The rotation unit includes at least one alignment plate for rotating the packaged item, which plate is arranged at an outer edge of the conveyor belt and can be moved into the conveying path of the packaged item, and a control unit for controlling the alignment plate, and the control unit is configured to trigger the alignment plate, depending on the diagonal of the packaged item.

8 Claims, 5 Drawing Sheets

(56)                     References Cited

U.S. PATENT DOCUMENTS

| | | | | |
|---|---|---|---|---|
| 7,861,847 B2 * | 1/2011 | Fourney | ................. | B65G 17/24 |
| | | | | 198/433 |
| 7,896,150 B2 * | 3/2011 | Smalley | ................. | B65G 43/08 |
| | | | | 198/370.03 |
| 10,569,966 B2 * | 2/2020 | Smit | ................... | B65G 47/2445 |
| 11,708,223 B2 * | 7/2023 | Gharz | ................... | B65G 47/96 |
| | | | | 198/456 |
| 2005/0115801 A1 * | 6/2005 | Holmgren | ........... | B65G 47/244 |
| | | | | 198/457.06 |
| 2008/0164316 A1 * | 7/2008 | Patel | ...................... | H04N 23/60 |
| | | | | 235/462.43 |
| 2012/0099947 A1 * | 4/2012 | Heinz | .................... | D06F 93/00 |
| | | | | 414/800 |
| 2015/0210483 A1 | 7/2015 | Morency et al. | | |
| 2021/0174039 A1 * | 6/2021 | Edwards | ............ | G06K 7/10861 |
| 2022/0097981 A1 * | 3/2022 | Gharz | ................... | B65G 47/26 |
| 2023/0105562 A1 * | 4/2023 | Sanchez | ................. | B65G 47/24 |
| | | | | 382/103 |
| 2024/0417187 A1 * | 12/2024 | Cristoforetti | .......... | B65G 47/32 |

OTHER PUBLICATIONS

Office Action (with English translation) received from corresponding Application No. DE 102023124931.2, dated Jun. 4, 2024, 10 pages.

* cited by examiner

ROTATION SYSTEM FOR ROTATING A PACKAGED ITEM

CROSS-REFERENCE TO RELATED APPLICATIONS

The present application is based upon and claims the right of priority to DE Patent Application No. 10 2023 124 931.2, filed Sep. 15, 2023, the disclosure of which is hereby incorporated by reference herein in its entirety for all purposes.

TECHNICAL FIELD

The invention relates to a rotation system for a sorting system for at least partially rotating a packaged item, having a roller conveyor for the deposition of the packaged item and a conveyor belt, adjoining the roller conveyor, for transporting the packaged item along a rotation unit.

The invention furthermore relates to a method for rotating a packaged item by means of a rotation system.

BACKGROUND OF THE INVENTION

There has been a dramatic increase in the number of items sent in recent years, and there has therefore been a significant increase in the number of consignments to be processed at shipping hubs. In order to be able to offer rapid delivery within the shortest possible time, even with such large volumes, it is necessary for the consignments or packaged items to be processed and sorted quickly and efficiently at the shipping hubs.

In the sorting systems, the consignments or packaged items are placed on conveyor belts and are sorted and further processed not only according to destination region but, in particular in pre-sorting systems, also according to their size, and are transported further on additional conveyor belts. The consignments can be categorized differently, depending on the size of the packaged item.

In the sorting systems, the packaged items are normally pre-sorted in the pre-sorter and, for example, are assigned to trays with fixed dimensions, in which the packaged items are further processed by way of additional conveying options. The number of trays required is determined and provided according to the size of the packaged item. One frequent problem is that, during measurement by means of light barriers, the packaged items are often arranged obliquely to the conveying direction or to the measuring unit on the conveyor belt, and the dimensions of the packaged item cannot be determined correctly. If a packaged item is lying obliquely on the conveyor belt, measurement starts at the front left-hand corner and ends at the rear right-hand corner, for example. As a result, the detected length of the packaged item is greater than it actually is. This has the effect that the packaged items are often incorrectly sorted on account of incorrect measurements. In the example of assignment to trays, it is often the case that too many trays are provided for what is actually a small packaged item because the small packaged item has been incorrectly measured and thus identified as a larger item than it actually is. Consequently, capacities are often not used efficiently since a large number of packaged items are identified as larger than they actually are and therefore the space reserved in sorting systems, trays, transport vehicles etc. is incorrect.

DESCRIPTION OF THE INVENTION

On this basis, it is the object of the invention to provide a system which aligns the packaged items in an optimal manner before length determination, thus enabling incorrect measurements to be reduced or minimized.

This object is achieved by the subject matter of Patent Claim 1. Preferred further developments can be found in the dependent claims.

Thus, according to the invention, a rotation system for a sorting system for at least partially rotating a packaged item is provided, having a roller conveyor for the deposition of the packaged item and a conveyor belt, adjoining the roller conveyor, for transporting the packaged item along a rotation unit, wherein a measuring system, which comprises a light curtain and is configured to determine a length and a width of the packaged item, is arranged on the conveyor belt ahead of the rotation unit, the measuring system furthermore comprises an evaluation unit, which is configured to determine a diagonal of the packaged item, depending on the measured length and width of the packaged item, the rotation unit comprises at least one alignment plate for rotating the packaged item, which plate is arranged at an outer edge of the conveyor belt and can be moved into the conveying path of the packaged item, and a control unit for controlling the alignment plate, and the control unit is configured to trigger the alignment plate, depending on the diagonal of the packaged item.

It is thus a decisive point of the invention that, in the system, the packaged item first passes through a measuring system for measuring the length and width of the packaged item and that, depending on the diagonal determined therefrom, the rotation unit is triggered, with the result that the packaged item is rotated before it is measured for further processing. In this case, however, not every incoming packaged item is rotated as a standard practice. On the contrary, it is possible to select specifically which packaged items are to be rotated, thus enabling the time required for the rotation processes to be reduced to a minimum.

Where reference is made here to a "packaged item", this is intended to refer, in particular, to any transported item which can be transported individually. Packaged items refer, for example, to consignments, boxes, parcels, packets and/or cartons.

Here, "diagonal" refers, in particular, to the hypotenuse of a triangle, wherein the length and width of the packaged item form two sides of the right-angled triangle.

Where reference is made here to an "alignment plate", this refers, in particular, to a plate-shaped rotation device which can be moved into the conveying path of the packaged item, with the result that the packaged item strikes against the alignment plate and, if the movement in the conveying direction is maintained, is rotated around an edge of the alignment plate. During this process, the alignment plate pushes the packaged item in a manner similar to railway points. Here, "rotation" is interpreted, in particular, to mean a movement by which the packaged item is moved around at least one axis, with the result that it is aligned.

According to a preferred further development of the invention, the rotation system can be integrated into an existing sorting system, ensuring that the packaged item is provided to the existing sorting system after running through the rotation unit. The rotation system can be arranged upstream of an existing sorting system. For this purpose, the rotation system comprises its own measuring systems, and therefore the measurement and rotation of the packaged item works independently of an existing sorting system. After measurement and possibly rotation of the packaged item, it is supplied to the sorting system via a conveyor belt. There, the previously aligned packaged item can then be measured again according to the sorting process.

According to a preferred further development of the invention, in a normal position, the alignment plate rests flush against the outer edge of the conveyor belt and, in an active position, is oriented at a predetermined angle to the outer edge. "Outer edge" refers, in particular, to a boundary edge or alignment plate which is arranged on the left and right on the outside of the conveyor belt in order to prevent the packaged items falling off transversely to the conveying direction. Accordingly, the alignment plate is oriented in such a way that, in the normal position, i.e. in the inactive state, it rests flat against the outer edge. In this state, the normal vectors of the outer edge and of the alignment plate are parallel to one another, and both are perpendicular to the conveying direction. If the alignment plate is moved into the active position, it projects partially onto the conveyor belt. The normal vectors of the outer edge and of the alignment plate are not oriented parallel to one another.

According to a preferred further development of the invention, the alignment plate comprises a linear drive, which is configured to move the alignment plate between the normal position and the active position. Linear drives are based on various technologies. They are divided into mechanical, electromechanical, direct electric linear drives, referred to as linear motors, and hydraulic and pneumatic linear drives. In particular, a linear drive or linear drive system refers to all drive systems which lead to a translational movement. Linear drives allow the movement of machines and systems in a straight line or some other predetermined course. The linear drive preferably comprises a piston cylinder, particularly preferably a pneumatic cylinder or a hydraulic cylinder. The piston cylinder has a piston rod which can be moved in and out, thus enabling the alignment plate to be moved into the active position and back into the normal position. According to a preferred further development of the invention, the linear drive is configured to move as a whole counter to the conveying direction. This refers, in particular, to the movement of the entire linear drive and not the stroke motion. For this purpose, the linear drive and/or the alignment plate are, in particular, mounted on a mounting plate. The mounting plate can be moved counter to the conveying direction, thus enabling the linear drive, e.g. the piston cylinder, as a whole to be moved counter to the conveying direction and, during this process, the piston rod to be extended. By means of this additional degree of freedom, the linear drive can be arranged in a particularly space-saving manner at the outer edges of the conveyor belt, thus enabling the width of the conveyor belt, including the rotation unit, to be kept to a minimum and hence enabling the rotation system to be mounted in a space-saving manner. The mounting plate is preferably driven by a second linear drive, which, in particular, can be moved by up to 10 cm in the longitudinal direction.

According to a preferred further development of the invention, the rotation unit comprises at least two alignment plates. In this case, a respective alignment plate is preferably arranged at each outer edge of the conveyor belt. Both alignment plates can preferably be moved counter to the conveying direction by means of respective mounting plates, thus enabling the packaged item to be rotated from both sides, depending on the calculated diagonal. Each alignment plate and/or mounting plate is driven by means of a separate linear drive. Several positions are adopted by the at least two, preferably four, linear drives to enable all sizes of packaged item concerned to be rotated.

According to a preferred further development of the invention, for each outer edge of the conveyor belt, a first alignment plate is configured to move the packaged item perpendicularly to the conveying direction, and a second alignment plate is configured to move the packaged item along the conveying direction. Here, the rotational movement depends on the time at which the respective alignment plate is moved into the active position and on the forward movement by the conveyor belt.

According to a preferred further development of the invention, the roller conveyor has at one end a feed table with a sliding surface comprising a plastic. At the feed table, the packaged items are placed on the feed table and on the roller conveyor. Here, the feed table preferably has an edge consisting of a smooth plastic, thus improving the ability to slide. According to a preferred further development of the invention, the feed table has at least one light barrier, which is configured to determine the thickness and/or the length and/or the width of the packaged item. In particular, the feed table has two plastic blocks, which serve as a surrounding housing for the light barriers situated thereunder. There are preferably four light barriers and the same number of reflectors under the surrounding housing and on the opposite side.

The light barriers detect packaged items that are too thin, in particular packaged items with a thickness of <1 cm, packaged items that are too long, in particular with a length >125 cm, and/or consignments that are too small, in particular with a length and/or width <10 cm. If a packaged item that is unsuitable for machine handling is detected, a fault lamp preferably lights up. Thus, fewer packaged items that are unsuitable for machine handling get onto the system, and fewer faults occur.

The invention furthermore includes a method for rotating a packaged item by means of a rotation system described above, comprising the following method steps:

a) placing a packaged item on the roller conveyor, b) measuring the length and the width of the packaged item by means of the light curtain and supplying the length and the width of the packaged item to the evaluation unit, c) determining the diagonal from the previously measured length and width of the packaged item by means of the evaluation unit, d) if the length of the diagonal exceeds a first predetermined limit value and/or falls below a second predetermined limit value, triggering at least one alignment plate for at least partial rotation of the packaged item on the conveyor belt, and e) supplying the packaged item to a sorting system.

Thus, a further essential point of the invention is that the packaged item is first of all measured in length and width. On the basis of the length and width of the packaged item, the evaluation unit then determines the length of the diagonal by approximating a right-angled triangle and determining the hypotenuse. Depending on the length of the diagonal, a decision is taken as to whether the packaged item is rotated at all. Only if the length of the diagonal exceeds the first predetermined limit value and/or falls below the second predetermined limit value or is within a predetermined range of values is the packaged item rotated. Provision is preferably made for a different number of alignment plates to be activated, depending on the length of the diagonal. It is thus possible to specify that only those packaged items are rotated which routinely lead to incorrect measurements and to errors in the downstream sorting.

According to one preferred further development of the invention, the method comprises the following further method steps:

f) measuring a length of the packaged item by means of the light barrier, g) grouping the packaged item into at least one group A or one group B, depending on the length of the packaged item as measured by means of the light barrier.

After the length of the diagonal has been determined, and the packaged item has been rotated, the packaged item is in a better and straight position for subsequent measurement and sorting. Group A or Group B are, in particular, single-tray or double-tray groups. This means that all the packaged items which are assigned to Group A are transported onwards in a tray. Packaged items which are assigned to Group B are too large for one tray and are transported in two trays or a double tray. Thus, only those packaged items are rotated which may incorrectly be sorted into Group B, even though they could in fact be sorted into Group A. Packaged items which are sufficiently small and sufficiently large do not have to be rotated since they can be unambiguously assigned. Only in a boundary range between the two groups can there be incorrect measurements. In this way, the proportion of packaged items which are incorrectly assigned to Group B can be minimized, thus ensuring that no capacity is wasted and the overall sorting process becomes more efficient.

As a preferred option, the first predetermined limit value is 70 cm, and/or the second predetermined limit value is 82 cm. A packaged item which has a length of 55 cm and a width of 45 cm, for example, has a diagonal of 71.06 cm. If, therefore, this packaged item lies obliquely in the absence of a rotation system, and if the diagonal is incorrectly determined as a length, the packaged item is assigned to Group B, that is to say as a double tray item in the example above. The trays have the dimensions 70 cm×80 cm, for example, and therefore one tray is sufficient for the packaged item. For this reason, the packaged item is rotated in advance by means of the rotation unit, ensuring that it is positioned straight on the conveyor belt and is correctly aligned for the subsequent length measurement. The length measurement shows that the packaged item should be assigned to Group A. Only one tray is reserved for onward transport, and one tray's capacity is gained over a sorting system without a rotation system.

Depending on the length of the diagonal, it may be necessary to rotate the packaged item by different "distances" or "extents". The plurality of alignment plates is therefore preferably controlled and moved in accordance with the diagonal in order to trigger the individually necessary rotation of the packaged item. Depending on the length of the diagonal, it is possible, in particular, for just one alignment plate, two alignment plates on different sides, three alignment plates or all four alignment plates to be moved into the active position. As a particular preference, depending on the length of the diagonal, both alignment plates on different sides are moved into the active position by at least two or at most four linear drives.

These movements take place either transversely or transversely and longitudinally with respect to the conveying direction.

BRIEF DESCRIPTION OF THE DRAWINGS

The invention is explained further in detail below by means of a preferred exemplary embodiment with reference to the drawings.

In the drawings

DETAILED DESCRIPTION OF THE EXEMPLARY EMBODIMENTS

Figure 1:
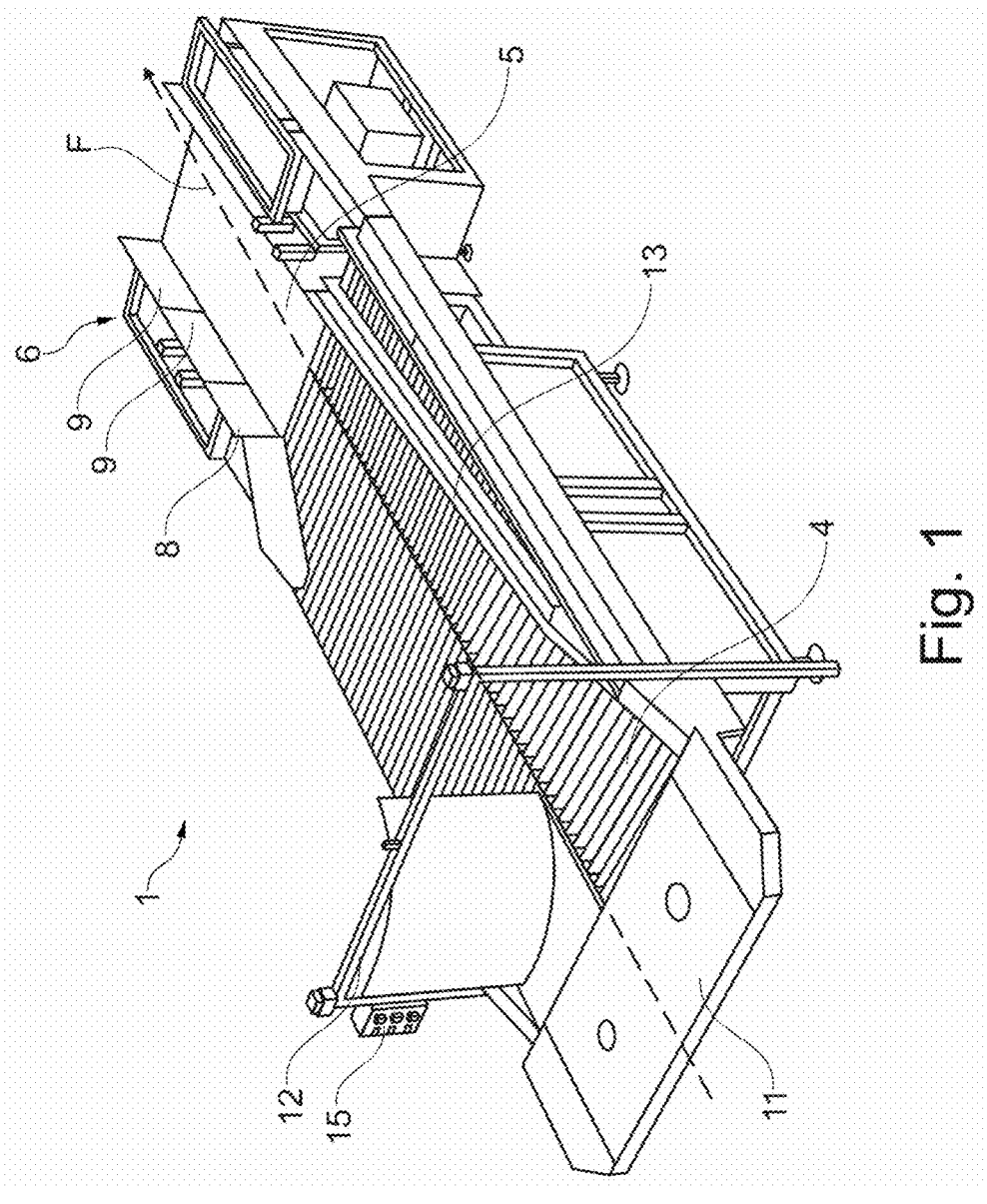
FIG. 1 shows schematically a rotation system according to a preferred exemplary embodiment of the invention in a perspective view.

FIG. 1 shows schematically a rotation system 1 according to a preferred exemplary embodiment of the invention in a perspective view. The rotation system 1 consists of a feed table 11, a roller conveyor 4 adjoining the feed table 11, and a conveyor belt 5 adjoining the roller conveyor 4. The packaged item 3 is placed on the feed table 11 and transported in conveying direction F. The roller conveyor 4 is arranged so as to slope downwards slightly, with the result that the packaged items 3 are moved not only in the direction of the conveyor belt 5 but also sideways in the direction of the rigid alignment cheek 13. The deposited packaged item 3 is aligned very roughly by means of the rigid alignment cheek 13. The light barrier 12 at the feed table detects the length, width and/or thickness of the packaged item 3 for a first time in order to detect packaged items that are unsuitable for machine handling, thus enabling them to be excluded. Alignment plates 9 are arranged on the left and right next to the conveyor belt 5. In FIG. 1, the movable alignment plates 9 are in their normal position. This means that the alignment plates 9 rest flush against the respective outer edge 8 of the conveyor belt 5. In this state, the packaged item 3 can pass through the rotation unit 6 without being rotated. This is the case when the packaged item 3 is small or large enough to avoid incorrect classification, e.g. as a single-tray or double-tray item. For the sake of clarity, the measuring system 7 is not illustrated in FIG. 1.

Figure 2:
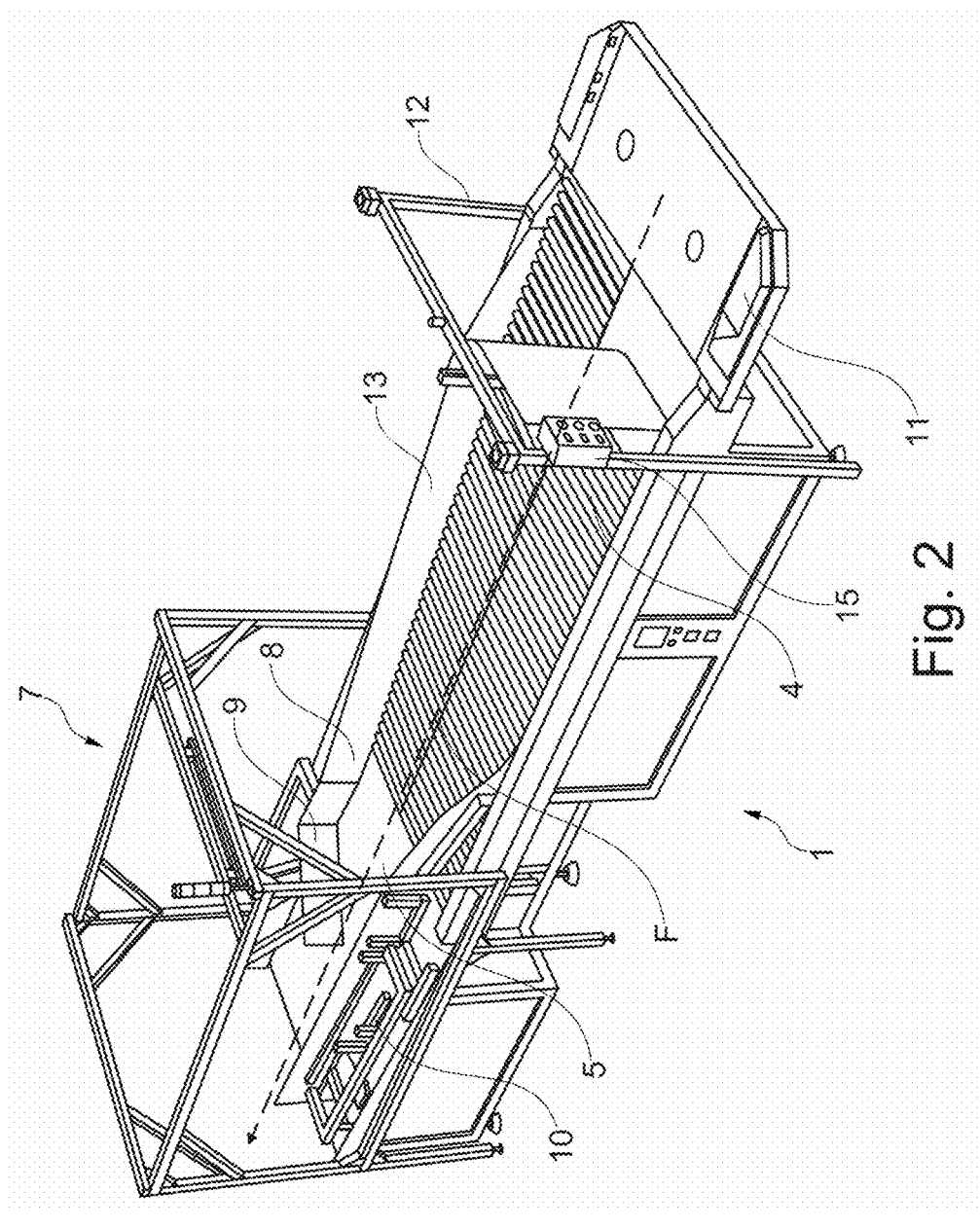
FIG. 2 shows schematically a rotation system according to a preferred exemplary embodiment of the invention in a perspective view.

FIG. 2 illustrates the rotation system 1 from FIG. 1, including the measuring system 7 and an alignment plate 9 in the active position. The measuring system 7 comprises a light curtain and is arranged in a cube-shaped frame above the rotation unit 6. In this way, it is additionally possible to ensure work safety. The alignment plate 9 is in the active position. This means that the alignment plate 9 is no longer resting flush or flat against the outer edge 8 of the conveyor belt 5 but is oriented at an angle to the outer edge 8. The pressure cylinders 10 are arranged at the side of the conveyor belt 5 and can move the alignment plate 9 into the active position. If the packaged item 3 is then moved further in the direction of the conveying direction F and, during this process, strikes against the projecting alignment plate 9, it is rotated around that edge of the alignment plate 9 which points towards the centre of the conveyor belt 5. Alternatively, the conveyor belt 5 can be stopped and the alignment plate 9 moved out, with the result that the packaged item 3 is rotated in a static state.

Figures 3A, 3B:
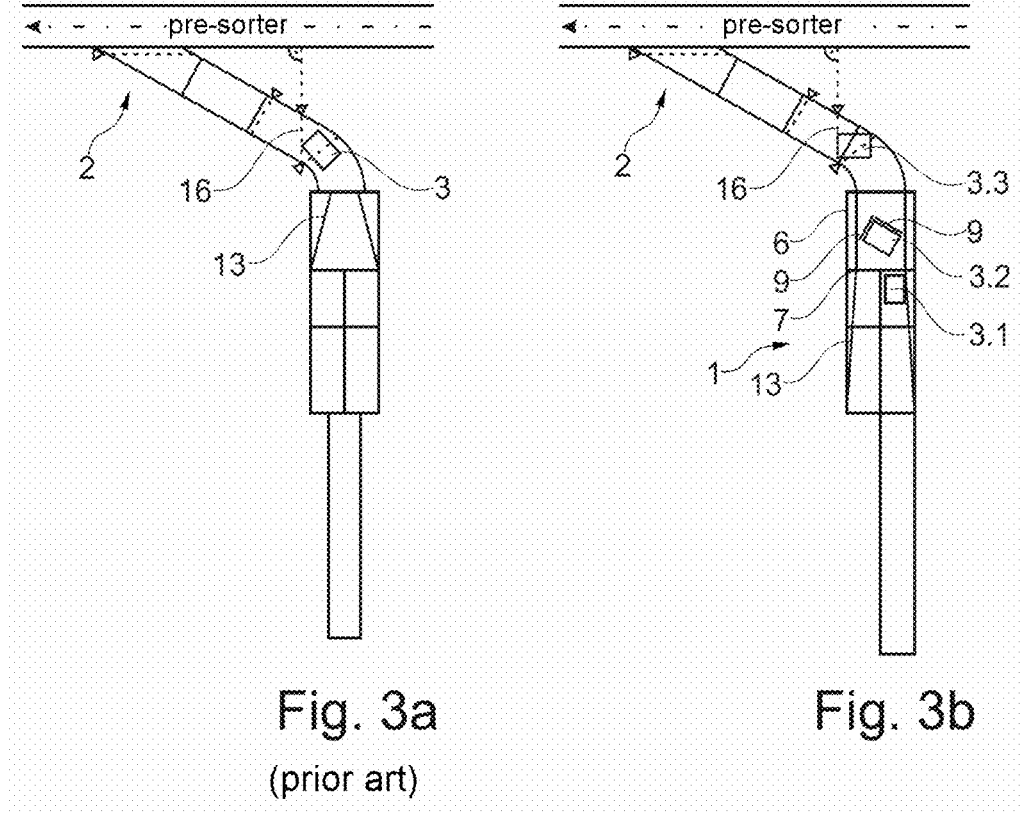
FIG. 3*a* shows schematically a simplified illustration of a sorting system according to the prior art in a plan view.
FIG. 3*b* shows schematically a simplified illustration of a rotation system and of a sorting system according to a preferred exemplary embodiment of the invention in a plan view.

FIG. 3 shows a conventional sorting system 2 and a sorting system 2 with an upstream rotation system 1 according to a preferred exemplary embodiment of the invention. FIG. 3*a* shows a conventional sorting system 2. The packaged item 3 is placed on the conveyor belt and roughly aligned by means of alignment cheeks 13. When the packaged item 3 then passes through a curve, it lies obliquely to the light barrier 16, with the result that it is not the actual length of the packaged item 3 but a diagonal, from the front left-hand corner to the rear right-hand corner, which is measured. The packaged item 3 is detected as longer than it actually is and is incorrectly grouped or transported onwards by the sorting system 2.

In FIG. 3*b*, a rotation system 1 is arranged ahead of the sorting system 2. The rotation system 1 can be constructed in a modular fashion ahead of the sorting system 2. The packaged item 3 is placed on the roller conveyor 4 of the rotation system 1 and roughly aligned by means of the extended alignment plates 13. The packaged item 3 is then in the first position 3.1. Upon entry to the rotation unit 6, the length and the width of the packaged item 3 is measured by means of the measuring system 7, and a diagonal is then determined.

If the length of the diagonal is in a predetermined boundary range, the packaged item 3 must be rotated to enable it subsequently to be correctly detected by the sorting system 2. In this case, the alignment plates 9 are moved into the active position, and the packaged item 3 is rotated. It is then in the second position 3.2. The packaged item 3 passes through the curve and is optimally aligned for the light barrier 16 to enable the packaged item to be correctly measured in the third position 3.3 and then grouped correctly.

Figure 4:
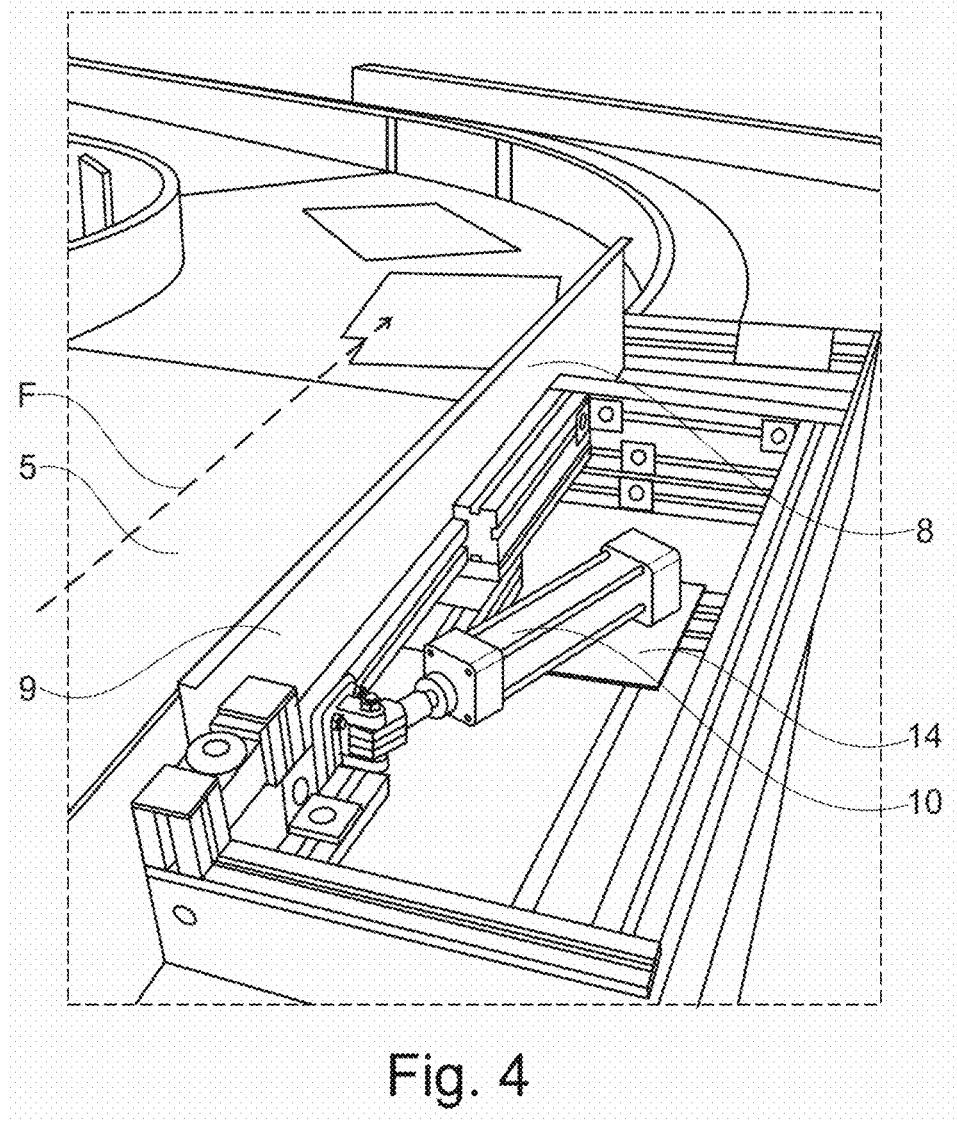
FIG. 4 shows schematically a linear drive according to a preferred exemplary embodiment of the invention in a perspective view.

In FIG. 4, a linear drive 10 in the form of a piston cylinder is arranged on an alignment plate 9. The alignment plate 9 is in the normal position and is resting flush against the outer edge 8 of the conveyor belt 5. The piston cylinder is arranged on a mounting plate 14 and is rotatably mounted on the latter. The mounting plate 14 can be moved counter to the conveying direction F and back again. Thus, if the alignment plate 9 is moved into the active position, not only the piston but also the complete piston cylinder is rotated counter to the conveying direction F by a movement of the mounting plate 14. This creates an additional degree of freedom and allows a sufficiently large movement or rotation to move the alignment plate 9 into the active position, and simultaneously reduces the space requirement in the transverse direction, thus enabling the rotation system 1 to be better integrated into existing systems.

Figure 5:
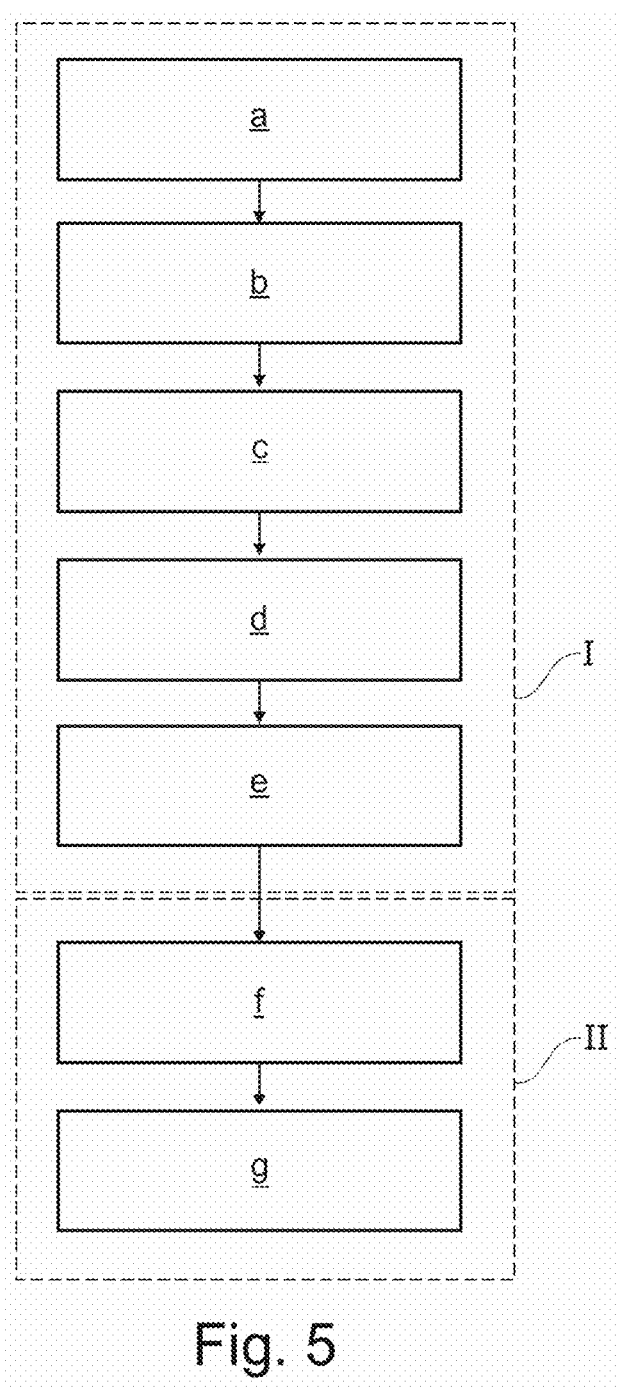
FIG. 5 shows a flow diagram of a method according to a preferred exemplary embodiment of the invention.

FIG. 5 shows a flow diagram of a method according to a preferred exemplary embodiment of the invention. Here, a first part I, steps a to e, is carried out by the rotation system 1, and a second part II, steps f and g, is carried out by or at the sorting system 2.

In a first step a), the packaged item 3 is placed on the roller conveyor 4. The packaged item 3 is transported in the conveying direction F. It impinges upon the measuring system 7 of the rotation unit 6, thus enabling the length and width of the packaged item 3 to be measured by means of the light curtain in step b). The measured values are transmitted to an evaluation unit, thus enabling the length of the diagonal to be determined in step c). In step d), a check is made to determine whether the length of the diagonal exceeds a first predetermined limit value and/or falls below a second predetermined limit value. If this is the case, the packaged item 3 is rotated. For this purpose, the conveyor belt 5 is halted, and the required alignment plates 9 are moved into the active position. This rotation is associated with a certain time delay. Once the alignment plates 9 are back in their normal position, the conveyor belt 5 is restarted. The rotated packaged item 3 is then supplied to an adjoining sorting system 2 in step e). There, the length of the packaged item 3 is measured in step f), and is grouped into a group A or into a group B in step g), depending on the length. The measured length is now the actual length and not a diagonal incorrectly measured as a length, thus enabling it to be used reliably for the grouping process. Thus, packaged items 3 which, given incorrect measurement of the length, are also incorrectly sorted, are rotated and aligned before length measurement in the sorting system 2. Incorrect assignment is thereby drastically reduced, thus enabling capacity to be used efficiently.

LIST OF REFERENCE SIGNS

1 rotation system
2 sorting system
3 packaged item
3.1 packaged item in the first position
3.2 packaged item in the second position
3.3 packaged item in the third position
4 roller conveyor
5 conveyor belt
6 rotation unit
7 measuring system
8 outer edge
9 alignment plate
10 linear drive
11 feed table
12 light barrier
13 rigid alignment cheek
14 mounting plate
15 signal lamp
16 second light barrier
F conveying direction
I first section
II second section

The invention claimed is:

1. A rotation system for a sorting system for at least partially rotating a packaged item, having a roller conveyor for the deposition of the packaged item and a conveyor belt, adjoining the roller conveyor, for transporting the packaged item along a rotation unit, wherein:

a measuring system, which comprises a light curtain and is configured to determine a length and a width of the packaged item, is arranged on the conveyor belt ahead of the rotation unit, the measuring system furthermore comprises an evaluation unit, which is configured to determine a diagonal of the packaged item, depending on the measured length and width of the packaged item, the rotation unit comprises at least one alignment plate for rotating the packaged item, which plate is arranged at an outer edge of the conveyor belt and can be moved into the conveying path of the packaged item, and a control unit for controlling the alignment plate, and the control unit is configured to trigger the alignment plate, depending on the diagonal of the packaged item, wherein, in a normal position, the alignment plate rests flush against the outer edge of the conveyor belt and, in an active position, is oriented at a predetermined angle to the outer edge; and wherein the alignment plate comprises a linear drive, which is configured to move the alignment plate between the normal position and the active position.

2. The rotation system according to claim 1, wherein the rotation system can be integrated into an existing sorting system, ensuring that the packaged item is provided to the existing sorting system after running through the rotation unit.

3. The rotation system according to claim 1, wherein the linear drive is configured to move counter to the conveying direction.

4. The rotation system according to claim 1, wherein the rotation unit comprises at least four alignment plates, and two alignment plates are arranged at each outer edge of the conveyor belt.

5. The rotation system according to claim 1, wherein, for each outer edge of the conveyor belt, a first alignment plate is configured to move the packaged item perpendicularly to the conveying direction, and a second alignment plate is configured to move the packaged item along the conveying direction.

6. The rotation system according to claim 1, wherein the roller conveyor has at one end a feed table with a sliding surface comprising a plastic.

7. The rotation system according to claim 1, wherein the roller conveyor has at one end a feed table, wherein the feed table has at least one light barrier, which is configured to determine at least one of the thickness, the length and the width of the packaged item.

8. A method for rotating a packaged item by means of a rotation system according to claim 1, comprising the following method steps:

a) placing a packaged item on the roller conveyor, b) measuring the length and the width of the packaged item by means of the light curtain and supplying the length and the width of the packaged item to the evaluation unit, c) determining the diagonal from the previously measured length and width of the packaged item by means of the evaluation unit, d) if the length of the diagonal exceeds a first predetermined limit value and/or falls below a second predetermined limit value, triggering at least one alignment plate for at least partial rotation of the packaged item on the conveyor belt, e) supplying the packaged item to a sorting system, f) measuring a length of the packaged item by means of a second light barrier, and g) grouping the packaged item into at least one group A or one group B, depending on the length of the packaged item as measured by means of the second light barrier.

* * * * *